United States Patent
King et al.

(10) Patent No.: US 9,261,965 B2
(45) Date of Patent: Feb. 16, 2016

(54) TOUCH SURFACE OVERLAY PANEL

(71) Applicant: The Boeing Company, Seal Beach, CA (US)

(72) Inventors: Thomas Moore King, Auburn, WA (US); Christopher David Braun, Maple Valley, WA (US)

(73) Assignee: THE BOEING COMPANY, Chicago, IL (US)

( * ) Notice: Subject to any disclaimer, the term of this patent is extended or adjusted under 35 U.S.C. 154(b) by 48 days.

(21) Appl. No.: 14/171,821

(22) Filed: Feb. 4, 2014

(65) Prior Publication Data
US 2015/0220147 A1    Aug. 6, 2015

(51) Int. Cl.
*G06F 3/01* (2006.01)
*G06F 3/0488* (2013.01)
*G06F 3/0354* (2013.01)
*G06F 3/0362* (2013.01)
*G06F 1/16* (2006.01)

(52) U.S. Cl.
CPC .............. *G06F 3/016* (2013.01); *G06F 1/1607* (2013.01); *G06F 3/0362* (2013.01); *G06F 3/03547* (2013.01); *G06F 3/03548* (2013.01); *G06F 3/04886* (2013.01)

(58) Field of Classification Search
CPC ....... G06F 3/016; G06F 3/044; G06F 3/0416; G06F 3/04886; G06F 3/03548; G06F 3/03547; G06F 3/0362; G06F 1/1607

USPC .......................................... 345/168, 173, 174
See application file for complete search history.

(56) References Cited

U.S. PATENT DOCUMENTS

| | | | |
|---|---|---|---|
| 7,993,201 B2 * | 8/2011 | Matsumoto ............. A63F 13/10 |  |
| | | | 345/173 |
| 8,368,662 B2 | 2/2013 | Argiro | |
| 8,558,796 B2 * | 10/2013 | Giancarlo et al. ............ 345/169 |
| 2006/0256090 A1 * | 11/2006 | Huppi ............................ 345/173 |
| 2008/0238879 A1 * | 10/2008 | Jaeger et al. ................... 345/173 |
| 2010/0328251 A1 * | 12/2010 | Sinclair ......................... 345/174 |
| 2012/0280935 A1 | 11/2012 | Romero | |
| 2013/0120258 A1 * | 5/2013 | Maus ............................. 345/161 |
| 2013/0335364 A1 * | 12/2013 | Tseng ............................ 345/174 |
| 2014/0111449 A1 * | 4/2014 | Lee .......................... G06F 3/039 |
| | | | 345/173 |

* cited by examiner

*Primary Examiner* — Tom Sheng
(74) *Attorney, Agent, or Firm* — Parsons Behle & Latimer

(57) ABSTRACT

An application runs on an electronic device having a touch surface, with one or more virtual controls on the touch surface. An overlay panel is attached to the electronic device, with one or more physical actuators mounted within a nonconductive frame. Each physical actuator has one or more conductive elements configured to create a conductive path through the physical actuator. Each physical actuator is aligned with and makes contact with one or more associated virtual controls on the touch surface, such that a user can operate the virtual control(s) by actuating the associated physical actuator(s).

20 Claims, 4 Drawing Sheets

TOUCH SURFACE OVERLAY PANEL

FIELD OF THE DISCLOSURE

The present application relates generally to accessories for touch-sensitive devices.

BACKGROUND

Touch-sensitive electronics can include a wide array of devices such as: tablet and notebook computers, netbooks, ATMs, POS or information kiosks, ticket-dispensing machines, portable media players, personal digital assistants, monitors, televisions, tablets, i-devices and Mobile Internet Devices or MIDs such as multi-media and Internet-enabled smart phones. Touch surfaces allow users of these devices to input commands, engage in data entry or otherwise control an actionable object or on-screen graphic through touch—typically by finger, thumb or stylus contact. The touch surface senses the coordinates of the "touch," through any of the varying means of touch-sensitive technologies, including those that are capacitive and resistive governed. The coordinate data registered via "touch-sensing" can then be relayed to the device's controller (or processor) for processing and can further be utilized by software associated with applications running on an electronic device with a touch surface to initiate a desired action.

In a capacitive-sensor system, the touch surface, typically glass coated with a material such as indium tin oxide to enhance conductivity across a sensor device, acts as a sensor. The capacitive-sensor system utilizes a conductive input, usually a user's finger, to register touch. Finger contact with the capacitive-based touch surface alters the electrostatic field, which is then interpreted by the processor and device's software, translating this touch into a gesture or command. Respective capacitive touch surfaces feature electrostatic-field monitoring circuitry, with points that can be arranged in the form of a grid. Each point on the grid is designed to register changes in electrostatic fields and process them accordingly, making multi-touch and multi-gestures possible.

Touch-sensitive devices, such as tablet computers, can run a wide variety of applications, including simulator applications intended to emulate the appearance and functionality of a physical control panel, such as a flight management computer (FMC) panel found in the cockpit of an aircraft. Indeed, numerous flight simulator applications have been developed for touch-sensitive devices, and such applications are widely used by recreational pilots and other aircraft enthusiasts. Despite their popularity, flight simulator applications running on touch-sensitive devices frequently cannot provide adequate tactile feedback to a user desiring to simulate actual operation of a physical control panel, such as an FMC panel. The same is true of a wide variety of other touch-sensitive applications, especially those intended to simulate interaction with a physical control panel of some kind.

Due to the inherent limitations of touch-sensitive devices, flight training for professional commercial or military pilots has often been limited to actual aircraft, fixed-base or full-flight simulators. Training on systems is also available by Computer Based Training (CBT), technical manuals or classroom instruction. Such flight simulation and training systems can provide users with the requisite tactile feedback to simulate actual flight deck operations. However, such simulation systems are often quite expensive and large, making them impractical for implementation on portable touch-sensitive devices.

SUMMARY

The present application discloses an overlay panel for an electronic device with a touch surface that provides tactile feedback to a user desiring to simulate operation of a control panel with physical actuators, such as pushbuttons, switches, sliders, knobs, etc.

In one example, an overlay panel is provided for an electronic device having a touch surface mounted within a housing. The overlay panel comprises a frame made of a nonconductive material, one or more fasteners coupled to the frame, wherein the fasteners are configured to attach the frame to the housing of the electronic device. The overlay panel further comprises one or more physical actuators mounted within the frame, each physical actuator having an upper portion that extends above the frame and a lower portion that extends below the frame. The upper portion of each physical actuator is configured to be actuated by a user and the lower portion of each physical actuator is configured to contact the touch surface when the frame is attached to the housing of the electronic device. Each physical actuator comprises one or more conductive elements configured to create a conductive path from the upper portion of each physical actuator to the lower portion of the physical actuator.

The touch surface may comprise a touchscreen or a trackpad. The overlay panel may be configured to simulate a flight management computer panel. The nonconductive material may comprise plastic or rubber. The fastener(s) may comprise one or more clips, clamps, straps, magnets, adhesive elements, or interlocking frame components. The conductive elements may be made of one or more of the following materials: conductive polymers, conductive foams, conductive gels, conductive liquids, or conductive wire. The physical actuator(s) may comprise one or more pushbuttons mounted in apertures within the frame, each pushbutton having a head, a spring, and a conductive pad. The physical actuator(s) may comprise one or more toggle switches mounted in apertures within the frame, each toggle switch having a lever, a spring, and a conductive pad. The physical actuator(s) may comprise one or more sliders mounted in slots within the frame, each slider having a tab and a conductive pad. The physical actuator(s) may comprise one or more rotary knobs mounted in apertures within the frame, each rotary knob having a handle and two or more conductive pads. The physical actuator(s) may comprise one or more nested rotary knobs/pushbuttons mounted in apertures within the frame, each nested rotary knob/pushbutton having a pushbutton assembly with a head, a spring, and a contact pad, the pushbutton assembly being surrounded by a first hollow cylindrical handle with a first pair of contact pads and a second hollow cylindrical handle with a second pair of contact pads.

In another example, a system comprises an electronic device having a touchscreen, the electronic device running an application displaying one or more virtual controls on the touchscreen. The system further comprises an overlay panel attached to the electronic device, the overlay panel comprising one or more physical actuators mounted within a nonconductive frame, each physical actuator having one or more conductive elements configured to create a conductive path through the physical actuator. Each physical actuator is aligned with and makes contact with one or more associated virtual controls displayed on the touchscreen, such that a user can operate the virtual control(s) by actuating the associated physical actuator(s).

The electronic device may comprise a tablet computer. The overlay panel may be configured to simulate a flight management computer panel. The physical actuator(s) may comprise one or more pushbuttons, toggle switches, sliders, rotary knobs, or nested rotary knobs/pushbuttons. The conductive elements may be made of one or more of the following materials: conductive polymers, conductive foams, conductive gels, conductive liquids, or conductive wire. The overlay panel may further comprise an opening through which a display region of the touchscreen is visible.

In another example, a method is provided for interacting with an application running on an electronic device with a touchscreen and displaying one or more virtual controls on the touchscreen. The method comprises attaching an overlay panel to the electronic device, the overlay panel comprising one or more physical actuators mounted within a nonconductive frame, each physical actuator having one or more conductive elements configured to create a conductive path through the physical actuator. Each physical actuator is aligned with and makes contact with one or more associated virtual controls displayed on the touchscreen. The method further comprises actuating a physical actuator to operate the virtual control(s) displayed on the touchscreen that are associated with the physical actuator, without contacting the touchscreen directly, and observing the effect of operating the virtual control(s) by monitoring a display region of the touchscreen.

BRIEF DESCRIPTION OF THE DRAWINGS

Like reference numbers and designations in the various drawings indicate like elements.

DETAILED DESCRIPTION

Figure 1:
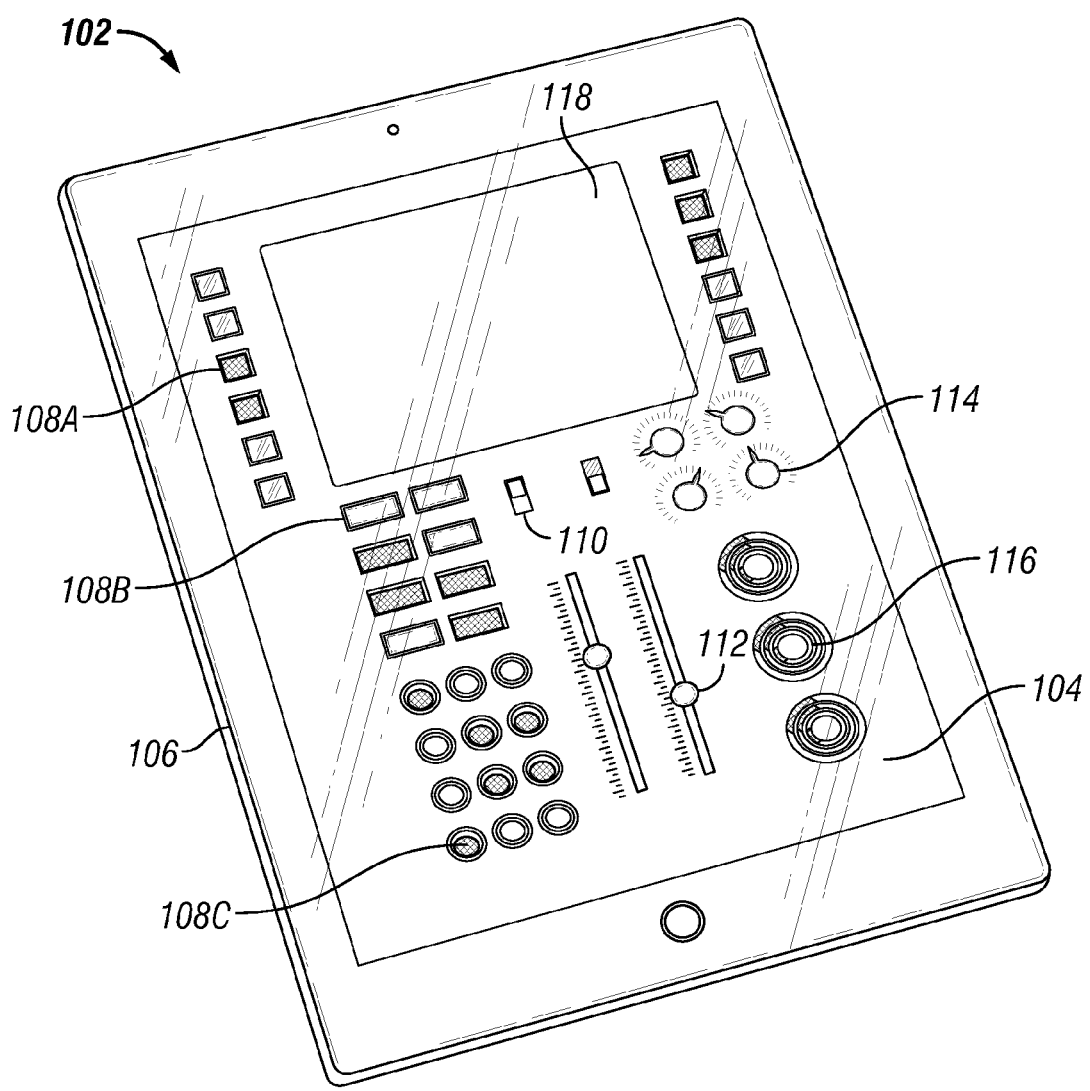
FIG. 1 illustrates one example of an electronic device with a touch surface displaying various virtual buttons and other controls.

FIG. 1 illustrates one example of an electronic device 102 comprising a touch surface 104 mounted in a housing 106. The touch surface 104 may comprise any surface with one or more suitable touch-sensitive sensors, such as, for example, a touchscreen, trackpad, etc. In some cases, the touch surface 104 may support multi-touch functionality, meaning that the touch surface 104 may recognize the presence of two or more simultaneous points of contact to perform certain advanced functions, such as: (a) a "shift key" acting as a modifier for an alphanumeric key pressed at the same time; or (b) simultaneous manipulation of two or more controls on the touch surface 104. In other cases, the touch surface 104 may not support multi-touch functionality.

In the illustrated example, the electronic device 102 comprises a tablet computer. In other examples, the electronic device 102 may comprise any device with a suitable touch surface 104, such as, for example, a smart phone, notebook computer, netbook, monitor, media player, personal digital assistant, etc. In the example shown in FIG. 1, the touch surface 104 comprises a touchscreen. An application running on the electronic device 102 displays a graphical user interface (GUI) comprising virtual buttons 108, switches 110, sliders 112, dials 114, and nested dials 116 on the touch surface 104, which enable a user to interact with the application via the touch surface 104. In the illustrated example, the virtual buttons 108 comprise a variety of suitable shapes (i.e., square buttons 108A, rectangular buttons 108B, and circular buttons 108C), although a wide variety of alternative shapes are possible beyond the examples shown. In addition, a portion of the touch surface 104 functions as a display region 118, in which suitable content (e.g., text, data, graphics, video, etc.) is displayed to the user, under the control of the application.

In the example shown in FIG. 1, the application running on the electronic device 102 is configured to emulate a control panel for a vehicle, such as a flight management computer (FMC) for an aircraft. Such an application enables the user to practice operating the control panel in a simulation environment. For example, the user can manipulate one or more virtual buttons 108, switches 110, sliders 112, dials 114, or nested dials 116 to input data and/or to simulate control of a vehicle. The application, in turn, can simulate the effect of the user input on the vehicle, and display appropriate content in the display region 118. Of course, this example is merely illustrative, and many other applications may run on the electronic device 102 with GUIs displaying a wide variety of additional or alternative virtual buttons or other virtual controls on a touchscreen.

In many applications, such as the example shown in FIG. 1, the virtual buttons and other controls displayed on the touchscreen may be difficult to operate due to constraints on the size, arrangement, and operation of the virtual controls. For example, a user may have difficulty operating a virtual dial 114 or nested dial 116 on the touchscreen with precision. In addition, although the virtual buttons and other controls can be arranged on the touchscreen with the same layout as a control panel desired to be simulated, in many cases a touchscreen cannot provide adequate tactile feedback to the user to simulate actual operation of the physical control panel.

Figure 2:
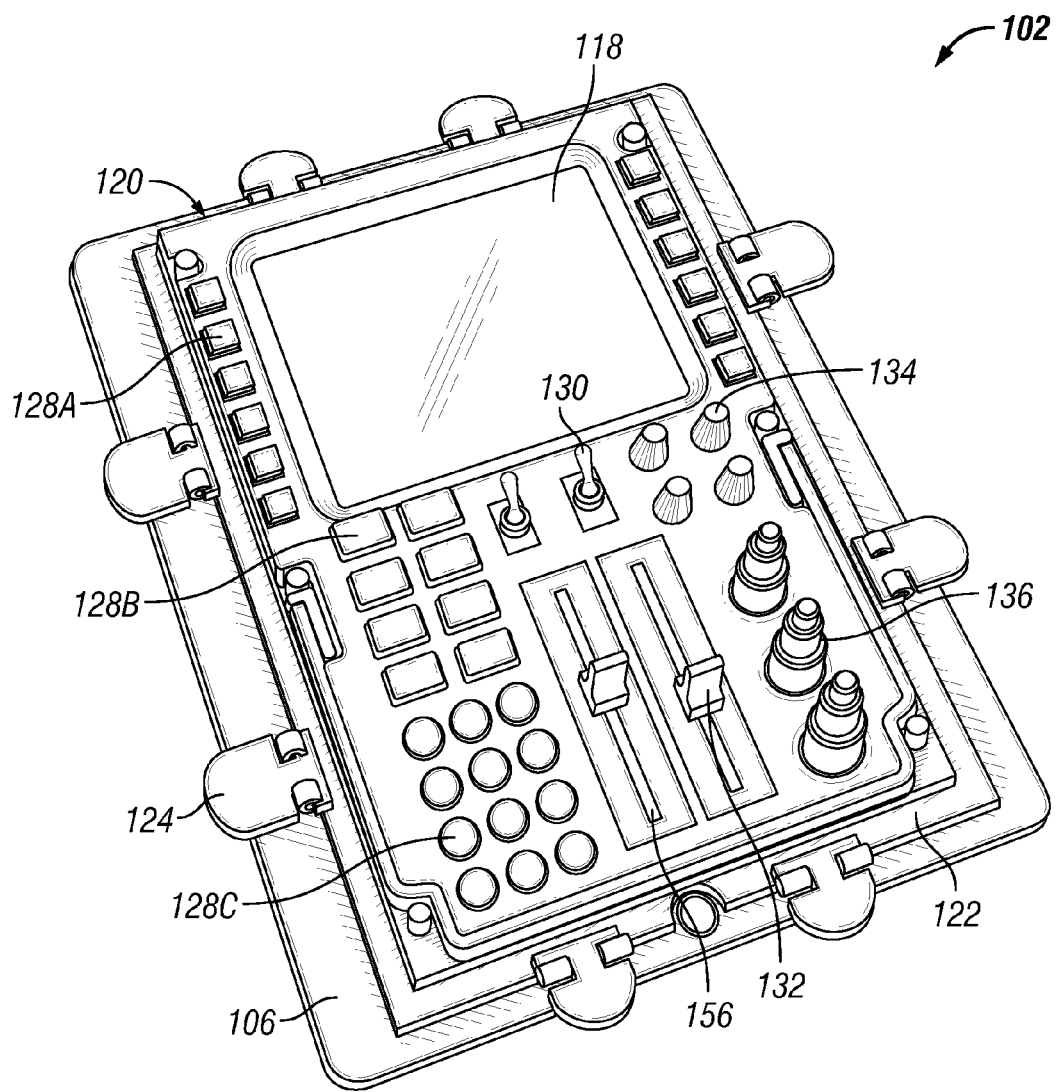
FIG. 2 illustrates one example of a touch surface overlay panel attached to an electronic device with a touch surface.

FIG. 2 illustrates one example of a touch surface overlay panel 120 having a frame 122 attached to the housing 106 of an electronic device 102 with a plurality of fasteners 124. The frame 122 of the overlay panel 120 may comprise any suitable nonconductive material, such as, for example, plastic or rubber. In the illustrated example, the fasteners 124 comprise clips configured to secure the frame 122 of the overlay panel 120 to the housing 106 of the electronic device 102. In other examples, the fasteners 124 may comprise any suitable fastening mechanisms, such as clamps, straps, tabs, magnets, adhesive elements, interlocking frame components, etc., which are configured to secure the overlay panel 120 to the electronic device 102 in a predictable, repeatable location and orientation. The overlay panel 120 includes an opening through which the display region 118 of the touch surface 104 remains visible when the overlay panel 120 is attached to the electronic device 102.

In the example shown in FIG. 2, the overlay panel 120 comprises a plurality of physical actuators, including pushbuttons 128, toggle switches 130, sliders 132, rotary knobs 134, and nested rotary knobs/pushbuttons 136, mounted within the frame 122 of the overlay panel 120. As with the virtual buttons 108 shown in FIG. 1, the physical pushbuttons 128 of the overlay panel 120 may comprise a variety of suitable shapes, such as, for example, square pushbuttons 128A, rectangular pushbuttons 128B, and circular pushbuttons 128C, as shown in FIG. 2. Many other shapes and sizes are possible beyond the illustrated examples.

Each actuator has an upper portion that extends above the frame 122, which a user can manipulate to control the operation of the corresponding actuator, as well as a lower portion that extends below the frame 122 and contacts the touch surface 104 when the overlay panel 120 is attached to the electronic device 102. Those of ordinary skill in the art will appreciate that the physical actuators shown in FIG. 2 are merely illustrative, and other overlay assemblies 120 may comprise a wide variety of additional or alternative physical actuators, as may be appropriate for a given application.

Each actuator comprises one or more conductive elements, which may be made of any electrically-conductive material or materials, such as, for example, conductive polymers (e.g., polyaniline), conductive foams, conductive gels, conductive liquids, conductive wire, or any material that is conductively coated. The material of the conductive elements is preferably chosen and/or shielded to be non-abrasive to the touch surface 104. The lower portions of the actuators are configured to align with and contact associated virtual buttons or other controls on the touch surface 104, as shown in FIG. 1. The conductive elements are configured to create a conductive path through each actuator from the upper portion to the lower portion, such that conductive contact with the upper portion is carried to the lower portion of the actuator in contact with the touch surface 104.

In operation, when a user contacts the upper portion of a physical actuator, the capacitance stored in the user's finger is conveyed through the conductive element(s) of the actuator, which alters the amount of charge on the touch surface 104 at the location where the lower portion of the actuator contacts the touch surface 104. As a result, the conductive path through the physical actuator simulates the effect of the user's finger making direct contact with the touch surface 104 at the same location. When the user manipulates the upper portion of a physical actuator, the actuator, in turn, controls the operation of one or more associated virtual buttons or other controls on the touch surface 104. As described above, the application may change the content shown in the display region 118 of the touch surface 104 in response to the user input received via the virtual controls (indirectly through the physical actuators).

The overlay panel 120 advantageously enables the user to experience significant tactile feedback while operating the touch surface 104 of the electronic device 102, which allows the user to develop and reinforce the muscle memory associated with actual operation of the physical control panel simulated by the overlay panel 120. The operation of the exemplary physical actuators shown in FIG. 2 is described below.

Figure 3:
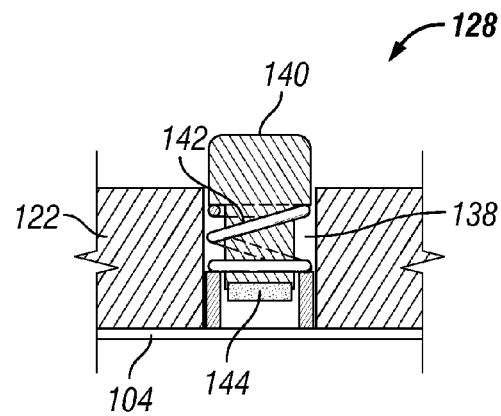
FIG. 3 illustrates a cross-sectional view of one example of a pushbutton mounted in a touch surface overlay panel.

FIG. 3 illustrates a cross-sectional view of one example of a physical pushbutton 128 mounted in an aperture 138 in the frame 122 of the overlay panel 120. In the illustrated example, the pushbutton 128 comprises a head 140, a spring 142, and a conductive pad 144. As described above, the head 140, spring 142, and conductive pad 144 are made of a suitable conductive material to create a conductive path through the pushbutton 128. In operation, the pushbutton 128 functions as a normally-open momentary switch. The spring 142 keeps the pushbutton 128 biased away from the touch surface 104 until a user presses the head 140, compressing the spring 142 and bringing the conductive pad 144 into contact with the touch surface 104, thereby actuating a virtual button 108 on the touch surface 104. In some cases, the spring 142 biases the pushbutton 128 away from the touch surface 104 as soon as the user releases the head 140, whereas in other cases, the spring 142 remains compressed until the user presses the head 140 again.

Figure 4A:
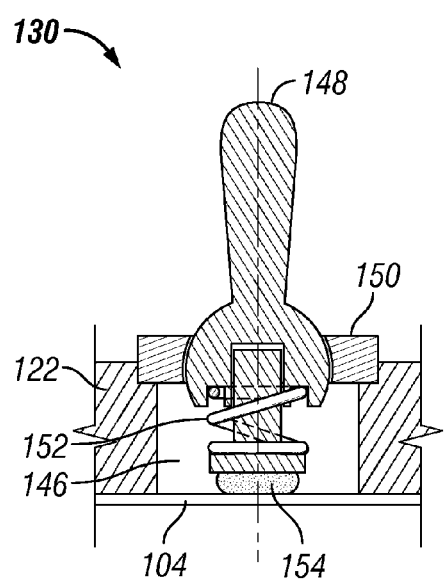
FIGS. 4A and 4B illustrate cross-sectional views of one example of a toggle switch mounted in a touch surface overlay panel.
Figure 4B:
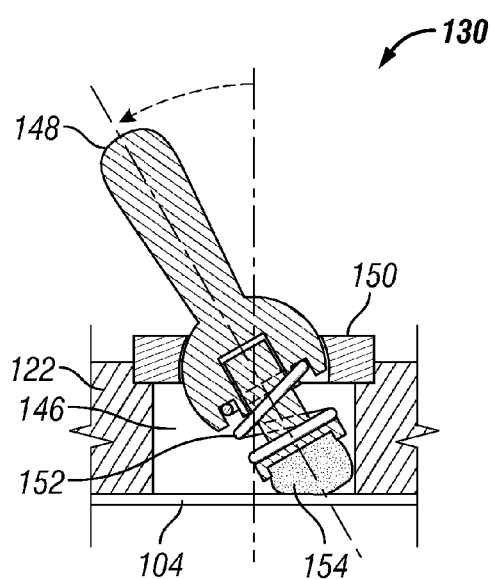

FIGS. 4A and 4B illustrate cross-sectional views of one example of a physical toggle switch 130 mounted in an aperture 146 in the frame 122 of the overlay panel 120. In the illustrated example, the toggle switch 130 comprises a lever 148 rotatably mounted in a mounting plate 150, as well as a spring 152 and a conductive pad 154. As described above, the lever 148, spring 152, and conductive pad 154 are made of a suitable conductive material to create a conductive path through the toggle switch 130. In operation, a user rotates the lever 148 from a first position, shown in FIG. 4A, to a second position, shown in FIG. 4B, while the spring 152 keeps the conductive pad 154 in contact with the touch surface 104, thereby toggling a virtual switch 110 on the touch surface 104. Regardless of the position of the toggle switch 130 and the contact of the conductive pad 154, user input ceases once the user's finger is removed from the toggle switch 130. Thus, in some cases, the underlying application running on the electronic device 102 is programmed to know what type of physical actuator is associated with a given position on the touch surface 104, and the application can track state changes of the virtual controls as required, e.g., one touch may set a given state, and a subsequent touch may revert that state.

Figure 5A:
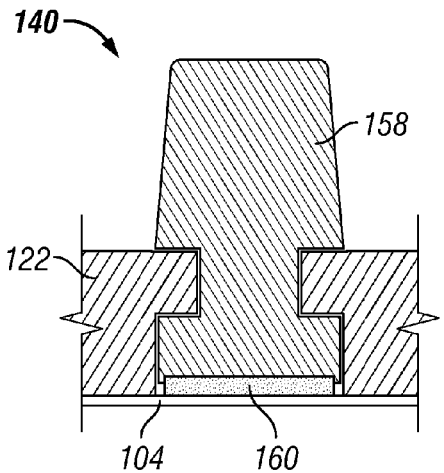
FIGS. 5A and 5B illustrate cross-sectional views of one example of a slider mounted in a touch surface overlay panel.
Figure 5B:
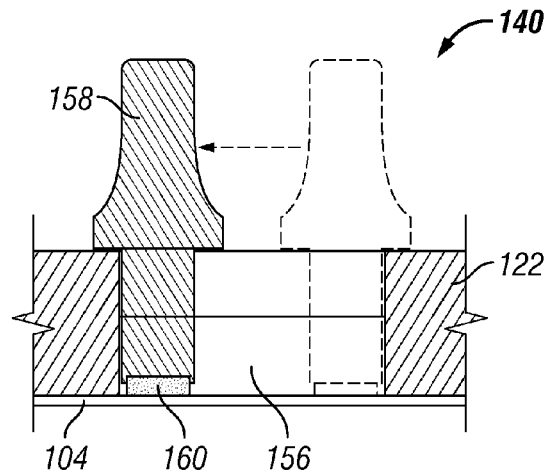

FIG. 5A illustrates a front cross-sectional view and FIG. 5B illustrates a side cross-sectional view of one example of a physical slider 132 mounted in a slot 156 in the frame 122 of the overlay panel 120. In the illustrated example, the slider 132 comprises a slidable tab 158 mounted in the slot 156, as well as a conductive pad 160. As described above, the tab 158 and conductive pad 160 are made of a suitable conductive material to create a conductive path through the slider 132. In operation, a user slides the tab 158 from a first position to a second position, as shown in FIG. 5B, while the conductive pad 154 remains in contact with the touch surface 104, thereby moving a virtual slider 112 to a desired position on the touch surface 104.

Figure 6A:
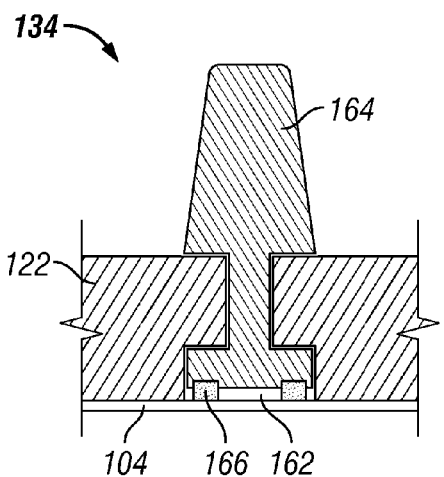
FIG. 6A illustrates cross-sectional view and FIG. 6B illustrates a perspective view of one example of a rotary knob mounted in a touch surface overlay panel.
Figure 6B:
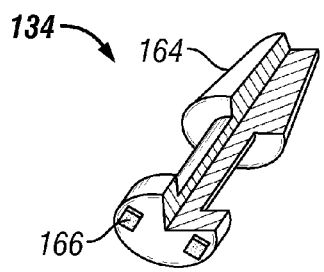

FIG. 6A illustrates a cross-sectional view and FIG. 6B illustrates a perspective view of one example of a physical rotary knob 134 mounted in an aperture 162 in the frame 122 of the overlay panel 120. In the illustrated example, the rotary knob 134 comprises a rotatable handle 164 mounted in the aperture 162, as well as a pair of conductive pads 166. As described above, the handle 164 and conductive pads 166 are made of a suitable conductive material to create a conductive path through the rotary knob 134. In operation, a user rotates the handle 164 while the conductive pads 166 remain in contact with the touch surface 104, which simulates two fingers contacting the touch surface 104 simultaneously and rotating (a multi-touch operation), thereby causing a virtual dial 114 to rotate to a desired position on the touch surface 104.

Figure 7:
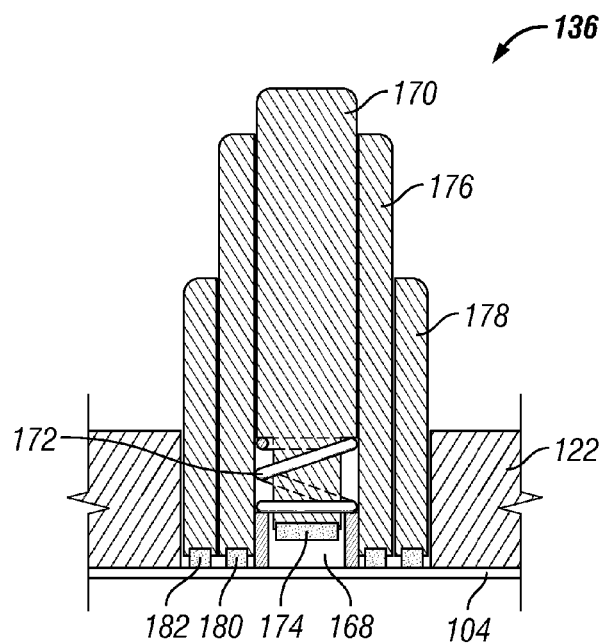
FIG. 7 illustrates a cross-sectional view of one example of a nested rotary knob/pushbutton mounted in a touch surface overlay panel.

FIG. 7 illustrates a cross-sectional view of one example of a nested rotary knob/pushbutton 136 mounted in an aperture 168 in the frame 122 of the overlay panel 120. In the illustrated example, the nested rotary knob/pushbutton 136 comprises a pushbutton assembly with a head 170, a spring 172, and a conductive pad 174. The nested rotary knob/pushbutton 136 further comprises a first hollow cylindrical handle 176 surrounding the pushbutton assembly and a second hollow cylindrical handle 178 surrounding the first handle 176. The first handle 176 has a first pair of conductive pads 180, and the second handle 178 has a second pair of conductive pads 182. As described above, the components of the nested rotary knob/pushbutton 136 are made of a suitable conductive material to create a conductive path through the nested rotary knob/pushbutton 136. The components of the nested rotary knob/pushbutton 136 operate in a manner similar to that of the other physical actuators described above, to control the operation of a virtual nested dial 116 on the touch surface 104.

The overlay panel 120 advantageously enables an application running on an electronic device 102 with a touch surface 104 to simulate a control panel having physical actuators such as the examples shown and described in connection with FIGS. 2-7. For example, the overlay panel 120 enables a touch-sensitive application to simulate a physical FMC panel for an aircraft, with adequate tactile feedback to develop and reinforce muscle memory. The overlay panel 120 thus enables the electronic device 102 to function as a tactile simulator that is significantly more economical, portable, and convenient than a conventional fixed-base or full-flight simulator system. In addition, the system can be customized efficiently to simulate control panels for various aircraft models, etc. Multiple units can also be deployed in learning environments, allowing for greater group participation and learning collaboration.

Those of ordinary skill in the art will appreciate that other overlay assemblies 120 can be attached to the electronic device 102 to provide tactile feedback for a wide variety of additional or alternative physical actuators beyond the examples described above. Each unique overlay panel 120 may be configured to operate in conjunction with a specific application programmed to display virtual buttons and other controls on a touchscreen, corresponding to the physical actuators of the associated overlay panel 120. In some applications, the touchscreen may remain blank, hiding the controls, until the corresponding overlay panel 120 is attached.

In addition to providing tactile feedback, the overlay panel 120 can also function as a hardware key controlling access to the electronic device 102 or to one or more applications. For example, the overlay panel 120 can be used to create complex multi-touch input sequences that may be initiated based on simple or counterintuitive user input. Such an input sequence carried out by the overlay panel 120 may remain unknown even to the user initiating the sequence.

Although this disclosure has been described in terms of certain preferred configurations, other configurations that are apparent to those of ordinary skill in the art, including configurations that do not provide all of the features and advantages set forth herein, are also within the scope of this disclosure. Accordingly, the scope of the present disclosure is defined only by reference to the appended claims and equivalents thereof.

What is claimed is:

1. An overlay panel for an electronic device having a touch surface mounted within a housing, the overlay panel comprising:
   a frame made of a nonconductive material;
   one or more fasteners coupled to the frame, wherein the fasteners are configured to attach the frame to the housing of the electronic device; and
   one or more physical actuators mounted within the frame, each physical actuator having an upper portion that extends above the frame and a lower portion that extends below the frame,
   wherein the upper portion of each physical actuator is configured to be actuated by a user and the lower portion of each physical actuator is configured to contact the touch surface when the frame is attached to the housing of the electronic device,
   wherein each physical actuator comprises one or more conductive elements configured to create a conductive path from the upper portion of each physical actuator to the lower portion of the physical actuator, and
   wherein the one or more physical actuators mounted within the frame are aligned with virtual controls displayed on a touch screen.

2. The overlay panel of claim 1, wherein the touch surface comprises a touchscreen.

3. The overlay panel of claim 1, wherein the touch surface comprises a trackpad.

4. The overlay panel of claim 1, wherein the overlay panel is configured to simulate a flight management computer panel.

5. The overlay panel of claim 1, wherein the nonconductive material comprises plastic or rubber.

6. The overlay panel of claim 1, wherein the fastener(s) comprise one or more clips.

7. The overlay panel of claim 1, wherein the fastener(s) comprise one or more clamps, straps, magnets, adhesive elements, or interlocking frame components.

8. The overlay panel of claim 1, wherein the conductive elements are made of one or more of the following materials: conductive polymers, conductive foams, conductive gels, conductive liquids, or conductive wire.

9. The overlay panel of claim 1, wherein the physical actuator(s) comprise one or more pushbuttons mounted in apertures within the frame, each pushbutton having a head, a spring, and a conductive pad.

10. The overlay panel of claim 1, wherein the physical actuator(s) comprise one or more toggle switches mounted in apertures within the frame, each toggle switch having a lever, a spring, and a conductive pad.

11. The overlay panel of claim 1, wherein the physical actuator(s) comprise one or more sliders mounted in slots within the frame, each slider having a tab and a conductive pad.

12. The overlay panel of claim 1, wherein the physical actuator(s) comprise one or more rotary knobs mounted in apertures within the frame, each rotary knob having a handle and two or more conductive pads.

13. The overlay panel of claim 1, wherein the physical actuator(s) comprise one or more nested rotary knobs/pushbuttons mounted in apertures within the frame, each nested rotary knob/pushbutton having a pushbutton assembly with a head, a spring, and a contact pad, the pushbutton assembly being surrounded by a first hollow cylindrical handle with a first pair of contact pads and a second hollow cylindrical handle with a second pair of contact pads.

14. A system comprising:
   an electronic device having a touchscreen, the electronic device running an application displaying one or more virtual controls on the touchscreen; and
   an overlay panel attached to the electronic device, the overlay panel comprising one or more physical actuators mounted within a nonconductive frame, each physical actuator having one or more conductive elements configured to create a conductive path through the physical actuator,
   wherein each physical actuator is aligned with and makes contact with one or more associated virtual controls displayed on the touchscreen, such that a user can operate the virtual control(s) by actuating the associated physical actuator(s).

15. The system of claim 14, wherein the electronic device comprises a tablet computer.

16. The system of claim 14, wherein the overlay panel is configured to simulate a flight management computer panel.

17. The system of claim 14, wherein the physical actuator(s) comprise one or more pushbuttons, toggle switches, sliders, rotary knobs, or nested rotary knobs/pushbuttons.

18. The system of claim 14, wherein the conductive elements are made of one or more of the following materials: conductive polymers, conductive foams, conductive gels, conductive liquids, or conductive wire.

19. The system of claim 14, wherein the overlay panel further comprises an opening through which a display region of the touchscreen is visible.

20. A method for interacting with an application running on an electronic device with a touchscreen and displaying one or more virtual controls on the touchscreen, the method comprising:
- attaching an overlay panel to the electronic device, the overlay panel comprising one or more physical actuators mounted within a nonconductive frame, each physical actuator having one or more conductive elements configured to create a conductive path through the physical actuator, wherein each physical actuator is aligned with and makes contact with one or more associated virtual controls displayed on the touchscreen,
- actuating a physical actuator to operate the virtual control(s) displayed on the touchscreen that are associated with the physical actuator, without contacting the touchscreen directly; and
- observing the effect of operating the virtual control(s) by monitoring a display region of the touchscreen.

* * * * *